(12) United States Patent
Fuss et al.

(10) Patent No.: US 6,470,168 B1
(45) Date of Patent: Oct. 22, 2002

(54) ACD USING AN ADDED LOW RESOLUTION CCD TO PREVENT EVEN PARTIAL PRINTOUT

(75) Inventors: William A. Fuss, Rochester, NY (US); Zhigang Fan, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/790,467

(22) Filed: Feb. 22, 2001

(51) Int. Cl.$^7$ .............................. G03G 21/00; G06K 9/00
(52) U.S. Cl. ...................... 399/366; 382/135; 382/318
(58) Field of Search ................... 283/88, 902; 380/51; 399/366; 382/135, 218, 137, 194, 309, 318

(56) References Cited

U.S. PATENT DOCUMENTS

| | | | |
|---|---|---|---|
| 5,533,144 A | 7/1996 | Fan | .......................... 382/135 |
| 5,740,514 A * | 4/1998 | Natsudaira | .................. 399/366 |
| 6,289,125 B1 * | 9/2001 | Katoh et al. | ................. 382/194 |

* cited by examiner

Primary Examiner—Hoang Ngo
(74) Attorney, Agent, or Firm—Perman & Green, LLP

(57) ABSTRACT

An anticounterfeit detector (ACD) does both a high and low resolution scan of a document. The video signal resulting from the low resolution scan is used to detect a selected type of image, e.g., currency, negotiable securities, etc., by using ACD hardware or software. A corrective action is taken, e.g., preferably even partial printing from the high resolution scan is prevented, the video signal is invalidated, etc., if the selected image is detected. The low resolution signal can also be obtained by decimating or low pass filtering the high resolution signal.

25 Claims, 2 Drawing Sheets

ACD USING AN ADDED LOW RESOLUTION CCD TO PREVENT EVEN PARTIAL PRINTOUT

CROSS-REFERENCES TO RELATED APPLICATIONS

This application claims priority from U.S. application Ser. No.: 09/725,397, filed Nov. 29, 2000.

STATEMENT REGARDING FEDERALLY SPONSORED RESEARCH OR DEVELOPMENT

Not Applicable

BACKGROUND OF THE INVENTION

1. Field of the Invention

The present invention relates to anti-counterfeit detection (ACD) of currency or negotiable securities, and more particularly, to such detection as used in xerographic, ink jet, etc., copiers and printers.

2. Description of the Related Art Including Information Disclosed Under 37 CFR 1.97 and 1.98

ACD hardware and software is known from U.S. Pat. No. 5,533,144, hereby incorporated by reference.

In copiers, printers, and facsimile machines which have a high resolution scanner, the scanner provides a quick first copy out time by allowing scanning and printing at the same time. In such machines, providing ACD, while at the same time maintaining quick first copy out time, can be expensive. In particular, in order to accomplish this, internal buffers will have to be maintained which capture the high resolution data. These size of these buffers will be dictated by the amount of data needed by the ACD algorithms. There also exists the problem of partially printing currency by these machines before it is detected.

It is therefore desirable to have methods and apparatus for performing ACD which also allows quick first page out time.

BRIEF SUMMARY OF THE INVENTION

A process comprises obtaining a high resolution image signal of an object, obtaining a low resolution image signal of said object, and performing a corrective action if the low resolution signal represents a selected type of image.

An apparatus comprises a source of a high resolution image signal of an object, a source of a low resolution image signal of said object, and a corrector for performing a corrective action if the low resolution image signal represents a selected type of image signal.

BRIEF DESCRIPTION OF THE SEVERAL VIEWS OF THE DRAWING(S)

DETAILED DESCRIPTION OF THE INVENTION

Figure 1:
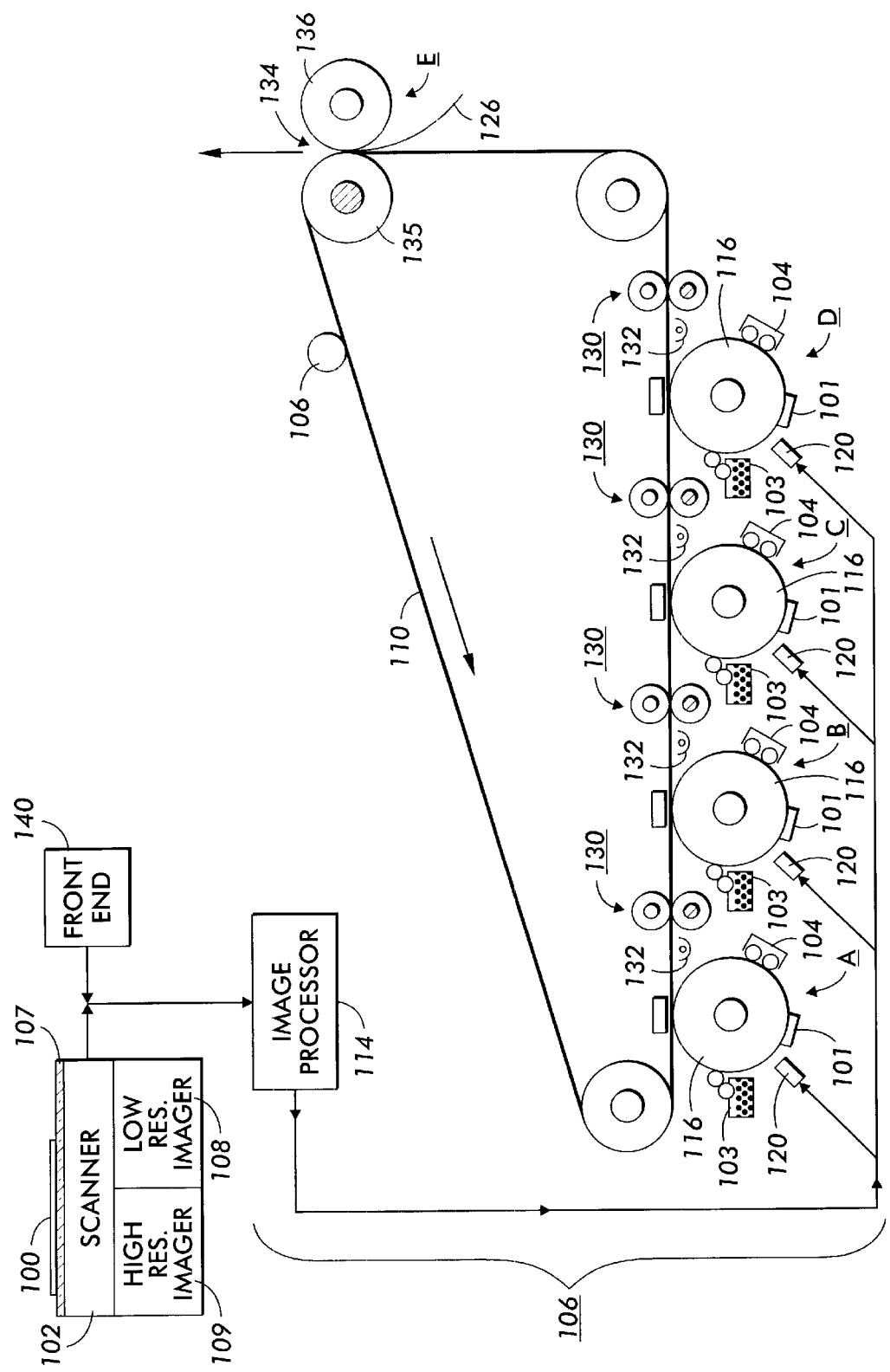
FIG. 1 is a block diagram of an embodiment of the invention.

FIG. 1 shows an embodiment, wherein a document 100 is disposed on a platen (not shown) of a scanner 102, which scanner can be a stand alone one or part of a system, e.g., xerography apparatus. Disposed within scanner 102 is both an added low resolution imager 108, e.g., a digital camera for imaging the platen, and a normally present high resolution imager 109, e.g. a CCD device, which images only a small portion of platen 107 at a time. Signals from both imagers 108 and 109 are provided to a printer 106, which can be, e.g., a local printer, a network printer, etc. This printer 106 can be an independent printer or be a part of a xerographic or non-xerographic copier, e.g., ink jet, or facsimile (fax) machine. Alternatively, the high resolution signal can be obtained from a remote analog or digital source received at input port 140. Then the low resolution signal can be obtained by low pass filtering (analog source) or decimating (digital source) the high resolution signal.

The details of printer 106 are substantially the same as shown in U.S. Pat. No. 5,991,201. An image processor 114 receives signals from scanner 102 or front end 140 and generates a color image. Digital signals which represent the blue, green and red density signals of the image are converted in the image processing unit into four bitmaps: yellow (Y), cyan (C), magenta (M), and black (K). The bitmap represents the values of the exposure required for each color component of the pixel. Image processor 114 may contain a low pass filter, a decimator a shading correction unit, an undercolor removal unit (UCR), a masking unit, a dithering unit, a gray level processing unit, and other imaging processing sub-systems known in the art. The image processor 114 can store bitmap information for subsequent images or can operate in a real time mode.

At stage A, toner of a first color is formed on either a belt or drum 116. The photoconductive member is preferably a drum of the type which is typically multilayered and has a substrate, a conductive layer, an optional adhesive layer, an optional hole blocking layer, a charge generating layer and a charge transport layer (none shown). The drum is charged by charging unit 101. Raster output scanner (ROS) 120, controlled by image processor unit 114, writes a first color image by selectively erasing charges on the drum 116. The ROS 120 writes the image information pixel by pixel. It should be noted that either discharged area development (DAD) can be employed in which discharged portions are developed or charged area development (CAD) can be employed in which the charged portions are developed with toner. After the electrostatic latent image has been recorded, drum 116 advances the electrostatic latent image to development station 103. Dry developer material is supplied by development station 103 to develop the latent image. In the case of CAD development, the charge of the toner particles is opposite in polarity to the charge on the photoconductive surface, thereby attracting toner particles thereto. The latent image is developed with a less than monolayer coverage of toner particles. On the average, the uniformity of the development is such that toner particles are near neighboring toner particles. Development station 103 employs small size toner, preferably having average particles size of about 5 μm.

The developed image is electrostatically transferred to the compliant, low surface energy intermediate member 110 by applying an electrical bias between the drum 116 and intermediate member or belt 110. Any residual toner on the drum 116 is removed with a cleaner 104. Intermediate member 110 may be either a roll or an endless belt with a conductive substrate and a compliant overcoat. The path of the belt is defined by a plurality of internal rollers. An optional plurality of heating elements 132 are in close proximity to the toned image such that the heat causes the toner particles present on the surface to soften. The softened toner particles pass through a film layer formation station 130. Station 130 includes a heated roller (not shown) which is in contact with the softened toner image and a backup pressure roll (not shown) behind intermediate member 110.

Filming station 130 spreads the softened toner particles into a thin film so that the small gaps between neighboring toner particles are covered with toner without degradation of the image. The toner flow required is very small to cover the spaces between the toner particles. Ideally, the film forming station should form a film of the desired thickness (about 1 μm) regardless of the local toner coverage. One possible way of achieving this is to make the heated roller self-spaced from the intermediate belt 110 at the desired thickness. One method for achieving this requirement would be to utilize a gravure-type roll for the heated roller not shown).

At stage B illustrated in FIG. 1, formation of a second color takes place in the same manner as described above. The drum 116 is charged with charging unit 101, and then it is exposed by ROS 120 according to second color image bitmap information. After the electrostatic latent image has been recorded, drum 116 advances the electrostatic latent image to development station 103. Dry developer material with toner of the second color is supplied by development station 103 to develop the latent image.

The developed image is electrostatically transferred to the intermediate member 110 by an electrical bias voltage between drum 116 and belt 110. (Any residual toner on drum 116 is cleaned by cleaner 104). The developed second color image is superimposed on the previous first color image. Heat from the optional heater 132 softens the toner particles. The softened toner particles on the intermediate member 110 pass through the heated filming station 116, which spreads the softened image into a thin film without degradation of the image.

The process is repeated for the next two colors at stages C and D. A multi-layer film image is formed by superimposing black, yellow, magenta, and cyan toners. The full color advances to transfusing stage E.

At transfuse nip 134 illustrated in FIG. 1, the multi-layer full-color film image is transfused to the recording sheet or paper 126 by the application of heat and pressure between a heated roll 135 behind the intermediate belt 110 and a backup pressure roll 136 behind the recording sheet. Moreover, recording sheet 126 may have a previously transferred toner image present on the back surface thereof as the result of a prior imaging operation, i.e. duplexing. As the recording sheet 126 passes through the transfuse nip 134, the multi-layer toner film adheres to the surface of the recording sheet 126, and due to greater attractive forces between the paper 126 and toner film, as compared to the attraction between the toner film and the low surface energy surface of the compliant intermediate member 110, the multilayer toner film is transferred to the recording sheet 126 as a full-color image. The transfused image becomes permanent once it advances past the transfuse nip 134 and is allowed to cool below the softening temperature of the toner materials. The cycle for forming another document is initiated following the cleaning of any residual toner from the intermediate belt 110 by cleaner 106.

Figure 2:
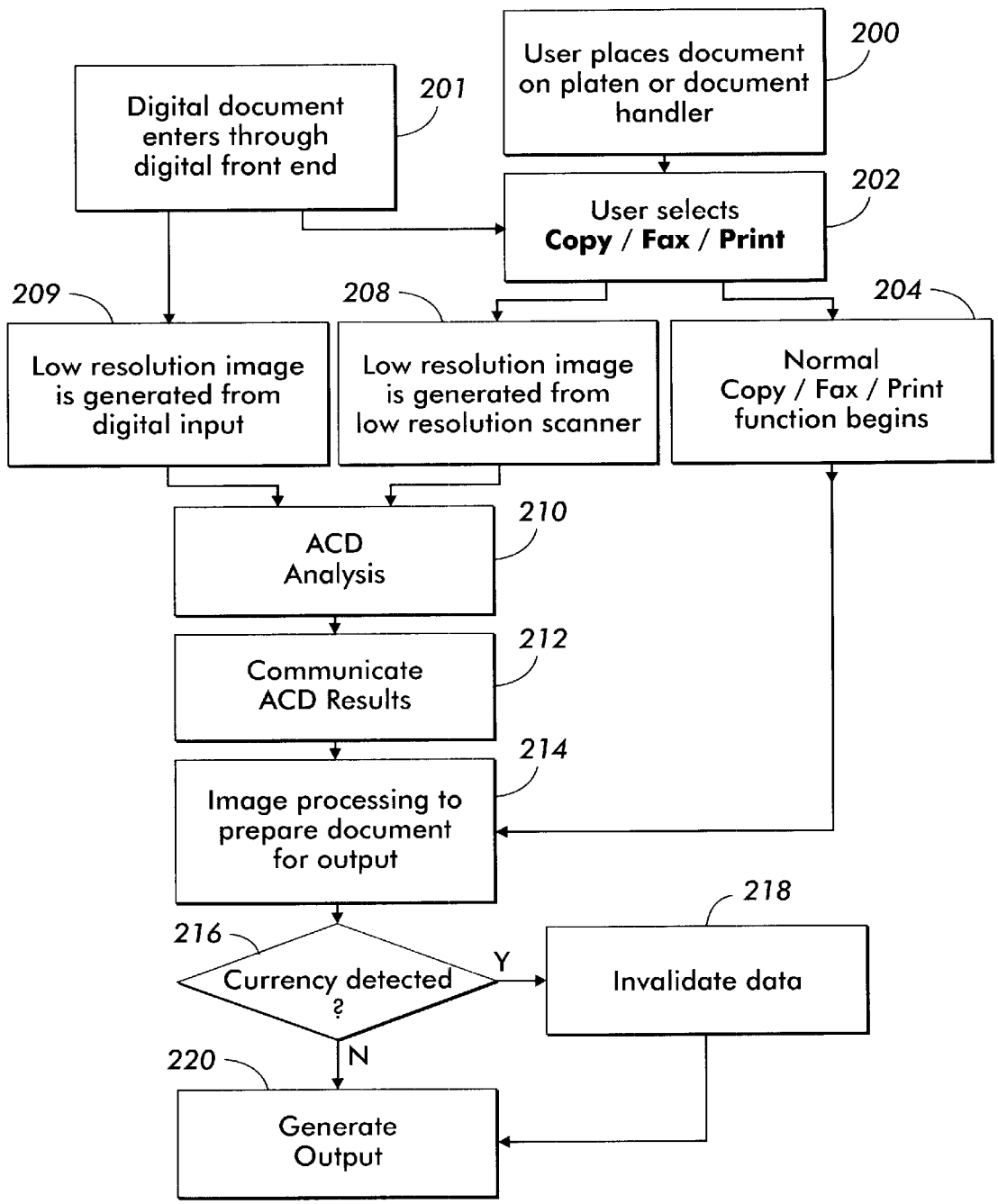
FIG. 2 is a flow chart of the operation of FIG. 1.

Normally within the scanner 102 or image processor 114 is software performing the operation as shown in FIG. 2. The first step 200 is the user placing the document 100 on platen 107. Other image acquisition methods, e.g., the user placing sheets on a feeder apparatus (not shown), etc., can be used. In particular, as shown by step 201, a digital document signal enters through a digital front end, e.g., front end 140. Then the user selects COPY or FAX by clicking on the appropriate icon (not shown) as shown by step 202. The low resolution imager 108 quickly provides signals representative of the entire platen at step 208. As shown at step 209, if the document entered through a front end, the low resolution image is quickly generated by decimation (digital signal) or low pass filtering (analog signal). The hardware or software for performing this can be in imager processor 114. Then at step 210 ACD analysis is done by e.g., as shown said U.S. Pat. No. 5,533,144, hereby incorporated by reference. Any other ACD hardware or software devices and methods can be used. Simultaneous with the above-described steps, and just after step 206, a COPY or FAX function is begun at step 204 using high resolution data, which is at a slower data rate than the low resolution data rate from low resolution imager 108 or from the decimator or low pass filter. This is sent to process step 214 as is the ACD results as indicated by step 212. Process step 214 prepares the document for printing after the appropriate image processing has been applied. Appropriate image processing could include scaling, halftoning, color correction, etc. and the results are sent to decision step 216 where it is determined if currency and/or negotiable securities, etc., are detected. If YES, then the video data is invalidated at step 218, preferably before even partial printing of currency occurs. This causes printer 106 to not properly print, e.g. to print "INVALID", print in only one color, completely stop printing, etc. If no currency has been detected, then the printer prints document 100 as indicated by step 220.

It will be appreciated that by adding an inexpensive low resolution imager 108 to scanner 102, it is possible to quickly perform ACD, thereby preventing even partial printing of currency. This quickness is due to the fact that there is less data from the low resolution imager 108 than from high resolution imager 109 and also that the ACD software does not require high resolution data.

While the present invention has been particularly described with respect to preferred embodiments, it will be understood that the invention is not limited to these particular preferred embodiments, the process steps, the sequence, or the final structures depicted in the drawings. On the contrary, it is intended to cover all alternatives, modifications, and equivalents as may be included within the spirit and scope of the invention defined by the appended claims. In addition, other methods and/or devices may be employed in the method and apparatus of the instant invention as claimed with similar results.

What is claimed is:

1. A process comprising:
    scanning a high resolution image signal of an object;
    scanning a low resolution image signal of said object; and
    performing a corrective action if the low resolution signal represents a selected type of image.

2. The process of claim 1, wherein said corrective action comprises stopping said high resolution obtaining step.

3. The process of claim 1, further comprising printing the results of said high resolution obtaining step.

4. The process of claim 3, wherein said corrective action comprises stopping said printing step.

5. The process of claim 4, wherein said stopping occurs before even partial printing.

6. The process of claim 1, wherein said selected type of image represents a member of the group consisting of negotiable securities and currency.

7. The process of claim 1, wherein said low resolution obtaining step comprises filtering said high resolution image signal.

8. The process of claim 1, wherein said low resolution obtaining step comprises decimating said high resolution image signal.

9. The process of claim 1, wherein said corrective action comprises invalidating said high resolution image signal.

10. An apparatus comprising:

a source of a high resolution image signal of an object;

a source of a low resolution image signal of said object;

a corrector for performing a corrective action if the low resolution image signal represents a selected type of image signal; and wherein said sources each comprises imagers.

11. The apparatus of claim 10, wherein corrective action comprises stopping said high resolution sourcing.

12. The apparatus of claim 10, further comprising a printer for printing said high resolution image signal.

13. The apparatus of claim 12, wherein said printer comprises xerographic printer.

14. The apparatus of claim 12, wherein said corrective action comprises said corrector stopping said printer.

15. The apparatus of claim 14, wherein said corrective action stops said printer before even partial printing occurs.

16. The apparatus of claim 12, wherein said printer comprises an ink jet printer.

17. The apparatus of claim 10, wherein said low resolution imager comprises a camera and said high resolution imager comprises a line scanner.

18. The apparatus of claim 10, wherein said low resolution source comprises a low pass filter receiving said high resolution image signal.

19. The apparatus of claim 10, wherein said low resolution source comprises a decimator receiving said high resolution image signal.

20. The apparatus of claim 10, wherein said selected type of image represents a member of the group consisting of currency and negotiable securities.

21. A xerographic apparatus comprising:

a low resolution scanner having a low resolution output image signal of an object;

a high resolution scanner having a high resolution output image signal of said object;

a corrector performing a corrective action if low resolution output signal represent a selected type of image; and a xerographic printer.

22. The apparatus of claim 21, wherein said corrective action comprises stopping said printer.

23. The apparatus of claim 22, wherein said stopping occurs before even partial printing.

24. The apparatus of claim 21, wherein said printer comprises at least one station.

25. The apparatus of claim 22, further comprising a plurality of stations respectively receiving color component signals from said high resolution scanner.

* * * * *